(12) United States Patent
Schweickhardt et al.

(10) Patent No.: US 7,197,384 B2
(45) Date of Patent: Mar. 27, 2007

(54) REGULATABLE SPRING-AND-DAMPER SYSTEM IN A VEHICLE

(75) Inventors: Tobias Schweickhardt, Stuttgart (DE); Ralph Streiter, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/540,016

(22) PCT Filed: Dec. 16, 2003

(86) PCT No.: PCT/EP03/14307

§ 371 (c)(1),
(2), (4) Date: Aug. 18, 2006

(87) PCT Pub. No.: WO2004/058523

PCT Pub. Date: Jul. 15, 2004

(65) Prior Publication Data
US 2006/0293814 A1    Dec. 28, 2006

(30) Foreign Application Priority Data
Dec. 23, 2002   (DE)   ............................. 102 60 788

(51) Int. Cl.
*B60G 23/00*       (2006.01)

(52) U.S. Cl. ........................................ 701/37; 701/38

(58) Field of Classification Search ............... 701/36, 701/37, 38, 1; 280/124.157, 5.507, 5.508, 280/124.159, 124.106, 5.502
See application file for complete search history.

(56) References Cited

U.S. PATENT DOCUMENTS

| | | | |
|---|---|---|---|
| 5,488,562 A | | 1/1996 | Otterbein et al. |
| 6,219,602 B1 | * | 4/2001 | Badenoch et al. ............ 701/37 |
| 6,285,935 B1 | | 9/2001 | Murata |
| 6,314,353 B1 | * | 11/2001 | Ohsaku et al. ................ 701/37 |
| 6,366,841 B1 | * | 4/2002 | Ohsaku ........................ 701/37 |
| 6,370,458 B1 | * | 4/2002 | Shal et al. .................... 701/37 |
| 6,389,341 B1 | * | 5/2002 | Davis ........................... 701/37 |
| 6,397,134 B1 | * | 5/2002 | Shal et al. .................... 701/37 |
| 6,761,371 B1 | * | 7/2004 | Heyring et al. ....... 280/124.157 |

FOREIGN PATENT DOCUMENTS

| | | |
|---|---|---|
| DE | 199 61 715 A 1 | 7/2001 |
| EP | 0 382 479 A1 | 8/1990 |
| EP | 0 499 790 A2 | 8/1992 |

\* cited by examiner

*Primary Examiner*—Richard M. Camby
(74) *Attorney, Agent, or Firm*—Crowell & Moring LLP

(57) ABSTRACT

A regulatable spring-and-damper system in a vehicle comprises a passive spring element and a damping element which is mounted in parallel and is configured with a damping characteristic that can be regulated in a variable manner and is determined by comparison with a reference system that can be actively regulated.

20 Claims, 2 Drawing Sheets

REGULATABLE SPRING-AND-DAMPER SYSTEM IN A VEHICLE

BACKGROUND AND SUMMARY OF THE INVENTION

The present invention relates to a regulatable spring-and-damper system in a vehicle.

In German publication DE 199 61 715 A1 there is a description of a spring-and-damper system which is fitted as a spring strut between the wheel and the body of a vehicle and is configured as a hydropneumatic system with a hydraulically filled displacer, a hydraulic accumulator and two lines connecting the displacer to the hydraulic accumulator. A regulatable throttle valve is arranged in one of the lines; the other line is surrounded by a device generating a magnetic field. The entire system is filled with a magnetorheological fluid, the flow properties of which can be changed by applying a magnetic field in one of the connecting lines. In this way, a variable damping force can be regulated in the line enclosed by the magnetic-field-generating device, whereas a constant damping force is generated in the parallel-running line with the throttle device. A spring force can be regulated in the system by means of the hydraulic accumulator, which has a compressible gas volume separated from the hydraulic medium.

An additional regulating possibility is provided by the supply or discharge of hydraulic medium via the throttle device. The volumetric flow of the hydraulic medium to be supplied or discharged represents a manipulated variable by means of which an actively controlled system can be realized. However, the supply of hydraulic fluid requires considerable expenditure of energy.

The invention addresses the problem of providing a regulatable spring-and-damper system which has properties that are essentially comparable to those of an active system but which only requires low expenditure of energy.

This problem is solved according to the invention by the claimed features. The dependent claims specify expedient developments.

The regulatable spring-and-damper system according to the invention in a vehicle comprises a passive spring element and a damping element which is mounted in parallel and is configured with a damping characteristic that can be regulated in a variable manner and is determined by comparison with a reference system that can be actively regulated. The spring-and-damper system represents a semi-active replacement system which is used instead of the active reference system and has essentially the same positive properties as the reference system but requires considerably less energy.

The spring-and-damper system according to the invention comprises a software part and a hardware part, the software part representing an interface between a controller, for example for controlling a chassis, and the hardware part. The damping characteristic of the regulatable damping element can be continuously adapted in the course of operation to the current situation. Changing the damping characteristic allows generation of an overall force acting on the spring-and-damper system which is made up of a passive component—without open-loop or closed-loop control—and an active component. The current value of the damping characteristic thereby depends on a manipulated variable which would act on the final control element fitted in the equivalent, active reference system. Since, in the spring-and-damper system according to the invention, this manipulated variable is used solely for calculating the way in which the damping element is regulated, but need not be physically implemented in the spring-and-damper system, significant advantages in terms of energy and structural design are obtained, since no expenditure of energy has to be provided for the supply and discharge of the medium corresponding to the manipulated variable, and accordingly no structural device required for this has to be provided either. Rather, it is sufficient to influence the damping element of the system according to the invention by changing the damping characteristic. The laws governing the way in which the damping characteristic is to be regulated are based on a comparison of the mathematical behavior of the active reference system with that of the semi-active system.

Since the spring-and-damper system according to the invention has a behavior equivalent to that of the active reference system it is intended to replace, existing control strategies and approaches can be transferred directly to the system according to the invention. It is not absolutely necessary to develop new or adapted control strategies. In connection with the interface, the semi-active system has the same, or at least approximately the same, functionality as the corresponding active system.

The spring-and-damper system according to the invention merely comprises a passive spring element and a damping element which is mounted in parallel with the latter and has a damping characteristic that can be regulated in a variable manner, irrespective of the construction of the active spring-and-damper system to be replaced. Both mechanical and hydraulic, pneumatic or mixed systems come into consideration, both in respect of the active system to be replaced and in respect of the semi-active spring-and-damper system actually used. The degree of complexity of the active system to be replaced is immaterial here; a different behavior on the part of the active system is taken into account via the interface and the function calculated there for the damping characteristic, so that the semi-active spring-and-damper system can always have the same construction.

A hydropneumatic system with a displacer and a hydropneumatic spring accumulator as the spring element is advantageously used as the semi-active spring-and-damper system, the hydraulic damper communicating with the hydraulic side of the spring accumulator via a connecting line in which a regulatable throttle is arranged. By changing the throttle cross section, the damping value can be changed.

To avoid low-frequency or quasi-steady components entering the calculation of the damping characteristic, the signal representing the manipulated variable can be subjected to high-pass filtering, in which frequencies in the signal above a predeterminable cutoff frequency are eliminated.

To repeat the essential idea of the invention in a general form: the regulatable spring-and-damper system according to the invention in a vehicle comprises a spring element and a damping element which is mounted in parallel with it, one of the elements being configured in an adjustable manner. To realize a semi-active system, the spring element is passive and the damping element is configured with a damping characteristic that can be regulated in a variable manner. The semi-active system can be described according to a force profile which can be represented as a function of a variable describing the spring constant of the passive spring element and/or of a variable describing a damping value that can be regulated in a variable manner and/or of a variable describing a state variable of the system and/or of a variable describing the derivative with respect to time of the state variable. The damping element is regulated by the damping value following at least approximately a relationship which can be represented as a function of the variable describing the spring constant of the passive spring element and/or of a manipulated variable and/or of a variable describing the derivative with respect to time of the manipulated variable and/or of the variable describing the state variable of the system and/or of the variable describing the derivative with respect to time of the state variable. This relationship is based here on a function which is known from an actively regulatable reference system with an adjustable final control element. The force profile of the reference system can be described according to a relationship which can be represented as a function of the manipulated variable and/or of the variable describing the derivative with respect to time of the manipulated variable and/or of the variable describing the state variable of the system and/or of the variable describing the derivative with respect to time of the state variable, with the manipulated variable and/or the variable of the adjustable final control element describing the derivative with respect to time of the manipulated variable being determinable in a closed-loop and open-loop control unit according to a stored mathematical relationship. The spring-and-damper system represents a semi-active replacement system which is used instead of the active reference system and has essentially the same positive properties as the reference system but requires considerably less energy.

Further advantages and expedient configurations can be taken from the further claims, the description of the figures and the drawings.

DETAILED DESCRIPTION OF THE INVENTION

Figure 1:
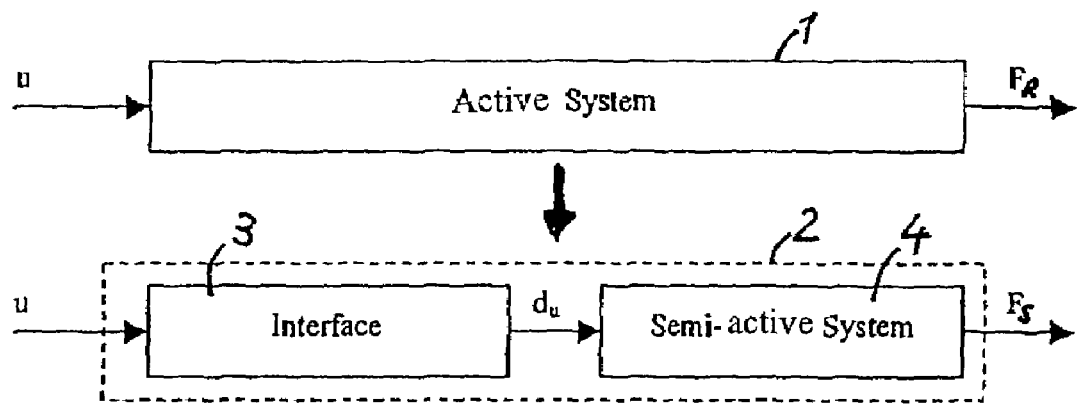
FIG. 1 shows a basic representation of an active reference system in a vehicle and also of a replacement system which can be used instead of the active system and comprises an interface and a semi-active spring-and-damper system.

In FIG. 1, two spring-and-damper systems are represented: firstly, an active spring-and-damper system, which is referred to as the reference system 1 and in which an active, controlled regulation can be carried out as a function of state variables and manipulated variables of the system by means of a stored control strategy, and also a replacement system 2, which comprises an interface 3 and a semi-active spring-and-damper system 4. The replacement system 2 is intended to replace the active reference system 1, it being intended for the physical and mathematical properties of the reference system 1 also to be essentially realized in the semi-active replacement system 2. It is also intended that the replacement system 2 can be activated by the same control strategies as the reference system 1.

The transfer into the replacement system 2 of a manipulated variable u to be supplied, by means of which the active reference system 1 can be controlled, is carried out via the interface 3, in which the signals of the manipulated variable u are converted into a variable damping value du, which is regulated in the semi-active system 4 for regulating the damping characteristic in a variable manner. In this way, the active reference system 1 can be replicated by the replacement system 2. Entered by way of example in FIG. 1 as the output variable is a force $F_R$ for the reference system 1 and $F_S$ for the semi-active system 4, these forces being identical or virtually identical in the case of an optimum transfer.

Figure 2:
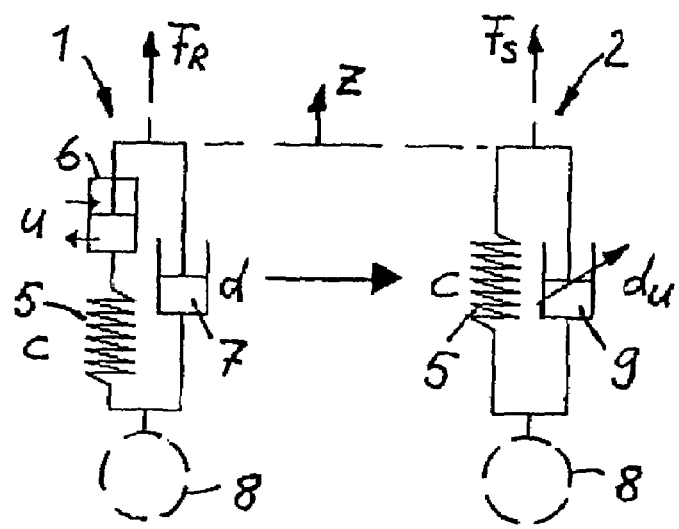
FIG. 2 shows representations of an active reference system and of a semi-active spring-and-damper system, a spring element and a final control element being mounted in series and a damping element being mounted in parallel both with the spring element and with the final control element in the active reference system, whereas the semi-active system comprises a passive spring element and a regulatable damping element mounted in parallel with it.

The reference system 1 represented in the left half of FIG. 2, with an active spring-and-damper system, comprises a passive spring element 5 with the spring constant c, an active final control element 6 with the manipulated variable u, mounted in series with the spring element 5, and a passive damping element 7 with the damping constant d, which is mounted in parallel both with the spring element 5 and with the final control element 6. The reference system 1 is configured as an active spring strut, via which a vehicle wheel 8 of a vehicle is to be connected to the body of the vehicle. The force FR acts on the reference system 1; z denotes the travel of the spring strut, which represents the state variable of the system.

The active reference system 1 is replaced by the semi-active replacement system 2. The replacement system 2 comprises a passive spring element 5 and an active damping element 9, which is mounted in parallel with it and the damping value du of which can be regulated to change the damping characteristic of the damping element. The replacement system 2 is also configured as a spring strut on which the force $F_S$ acts. The travel is likewise denoted by z; it also assumes the function of a state variable in the replacement system 2.

The force $F_R$ acting on the reference system 1 can be described in a general way according to the relationship $$F_R = -f(z, \dot{z}, u, \dot{u})$$

as a function f of the state variable z, of the derivative with respect to time $\dot{z}$ of the state variable, of the manipulated variable u and of the derivative with respect to time $\dot{u}$ of the manipulated variable.

The force $F_S$ acting on the replacement system 2 can be described in the case of the implementation of the replacement system 2 that is represented in FIG. 2 by the relationships $$F_S = -c \cdot z - d_u \dot{z}$$

$$d_u = \frac{-c \cdot z + f(z, \dot{z}, u, \dot{u})}{\dot{z}},$$

where c is the spring constant of the passive spring element 5 (identical to the spring constant or the spring element 5 of the reference system 1), $d_u$ is the variable damping value of the regulatable damping element 6 and $f(z, \dot{z}, u, \dot{u})$ denotes the function known from the reference system 1.

To avoid the damping value $d_u$ tending toward infinity when there is a zero crossing of the derivative with respect to time $\dot{z}$ of the state variable, an approximation function is introduced for the damping value du:

$$d_u \approx \frac{\dot{z}}{\mathrm{limit}[\dot{z}^2]_v^\infty}\{-c \cdot z + f(z, \dot{z}, u, \dot{u})\}.$$

In this, $\mathrm{limit}[\dot{z}^2]_v^\infty$ denotes the permissible interval within which the square of the rate of the state variable may move, a limit value v, which is for example $$\left(0.001\frac{m}{s}\right)^2,$$

being prescribed as the lower permissible limit, whereas the interval is open in the upward direction. The manipulated variable u or the derivative with respect to time $\dot{u}$ of the manipulated variable is determined in a closed-loop and open-loop control unit in accordance with a stored control or calculation specification.

In order to ensure that low-frequency and quasi-steady components do not enter the conversion for the damping adjustment of the replacement system, the manipulated variable u can be subjected in the closed-loop and open-loop control unit to a high-pass filtering according to the relationship $$u_{HP} = \frac{T_{HP} \cdot \dot{u}}{T_{HP} \cdot \dot{u} + u}$$

where $T_{HP}$ denotes a gain factor according to the relationship $$T_{HP} = \frac{1}{2 \cdot \pi \cdot f_{HP}}$$

$f_{HP}$ denotes the cutoff frequency of the high-pass filtering. The high-pass-filtered manipulated variable $u_{HP}$ is included in the determination of the damping value du.

In the case of the example according to FIG. 2, the force $F_R$ acting on the reference system 1 is calculated according to the relationship $$F_R = -f = -d \cdot \dot{z} - c(z-u)$$

The variable damping value $d_u$ is hereby obtained as $$d_u = \frac{-c \cdot z + f}{\dot{z}} = d - \frac{c \cdot u}{\dot{z}}$$

or, by applying the approximation function, as $$d_u \approx d - \frac{c \cdot u \cdot \dot{z}}{\mathrm{limit}[\dot{z}^2]_v^\infty}.$$

Figure 3:
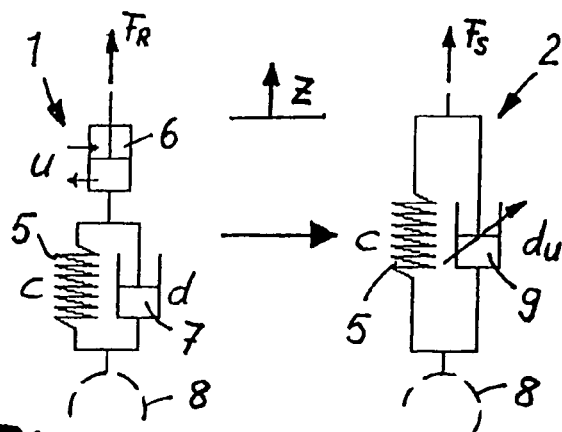
FIG. 3 shows a representation corresponding to FIG. 2, the active reference system comprising a passive spring element and a passive damping element mounted in parallel with it and an active final control element mounted in series with both elements.

In the case of the exemplary embodiment according to FIG. 3, the actively regulatable reference system 1 comprises a passive spring element 5 with the spring constant c, a passive damping element 7 with the damping constant d mounted in parallel with the passive spring element and a final control element 6 with the manipulated variable u mounted in series with both elements. The function $f$ of the reference system can be described according to the relationship $$f = d(\dot{z}-\dot{u}) + c(z-u)$$

where the derivative with respect to time $\dot{u}$ of the manipulated variable is now also included in this relationship. This produces the regulatable damping value $d_u$ of the damping element 9 of the replacement system 2 as $$d_u = \frac{-c \cdot z + f}{\dot{z}} = d - \frac{d \cdot \dot{u} + c \cdot u}{\dot{z}}$$

or, as an approximation function, as $$d_u \approx d - \frac{(d \cdot \dot{u} + c \cdot u)\dot{z}}{\mathrm{limit}[\dot{z}^2]_v^\infty}.$$

Figure 4:
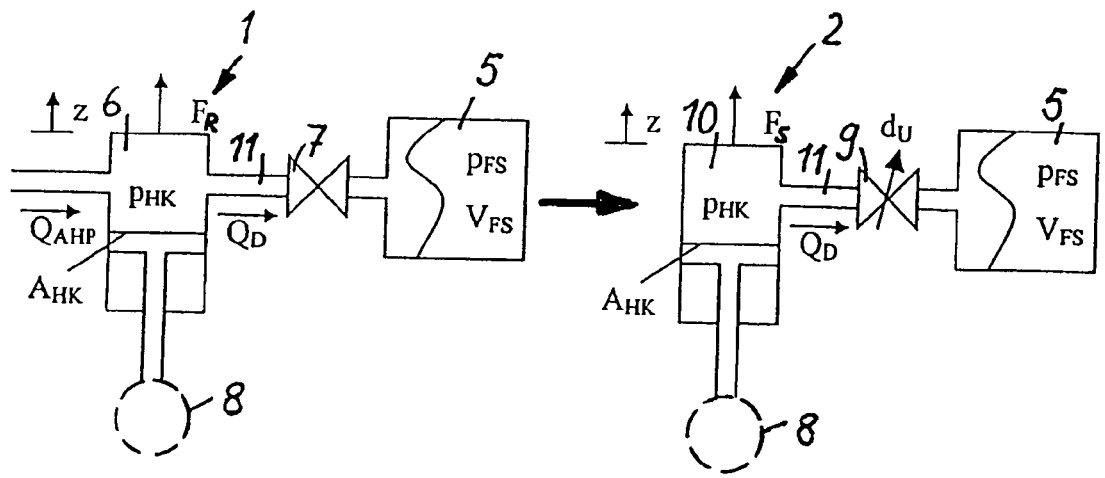
FIG. 4 shows an implementation for an active and a semi-active system corresponding to FIG. 3 configured as a hydropneumatic spring strut.

In FIG. 4, a hydropneumatic spring strut in a vehicle is represented as the spring-and-damper system and has in principle the same construction as the system from FIG. 3. The active hydropneumatic reference system 1 shown in the left half of the figure has a hydraulic final control element 6, which can be regulated by means of a volumetric flow of oil $Q_{AHP}$ that can be supplied or discharged, whereby the force $F_R$ can be regulated. The volumetric flow of oil $Q_{AHP}$ is proportional to the first derivative $\dot{u}$ of the manipulated variable:

$$\dot{u} = \frac{Q_{AHP}}{A_{HK}},$$

where $A_{HK}$ denotes the surface area of the main chamber of the final control element 6 configured as a displacer. For the manipulated variable u there is the relationship:

$$u = \frac{1}{A_{HK}} \int Q_{AHP} dt.$$

The hydraulic chamber of the final control element 6 communicates via a line 11, in which a passive damping element 7 configured as a constant throttle is arranged, with the likewise passively configured spring element 5, which is configured as a hydropneumatic spring accumulator and has a pneumatic chamber with the volume $V_{FS}$ and the gas or spring accumulator pressure $p_{FS}$ prevailing in it. The hydropneumatic spring element 5 permits vertical springing of the spring strut; the constant throttle 7 with the damping constant d generates a damping force proportional to the volumetric flow $Q_D$ through the throttle. The force $F_R$ acting on the reference system 1 is described by the equation $$F_R = -f = d\left(\dot{z} + \frac{1}{A_{HK}} Q_{AHP}\right) + c\left(z + \frac{1}{A_{HK}} \int Q_{AHP} dt\right)$$

In the case of the replacement system represented in the right half of FIG. 4, a volumetric flow of oil is not introduced into the system or discharged, but only redirected between the components of the system. A passive displacer 10, on which the vehicle wheel 8 is fitted, is provided. Arranged in the line 11 between the displacer 10 and the hydropneumatic spring element 5 is the damping element 9, which is configured as an adjustable throttle and has the regulatable damping value $d_u$, which can be regulated by means of a suitable adjusting unit, which acts on the throttle, by equating the relationship given above for the force $F_R$ in the reference system 1 and the force $F_S$ in the semi-active replacement system 2 according to the relationship $$d_u \approx d + \frac{\dot{z}}{\text{limit}[\dot{z}^2]_v^\infty}\left(d\frac{1}{A_{HK}} Q_{AHP} + c\frac{1}{A_{AH}} \int Q_{AHP} dt\right)$$

The spring stiffness c of the hydropneumatic spring element 5 can be calculated with a known reference pressure $p_0$ and a known spring stiffness $c_0$ at this reference pressure as a function of the pressure $p_{FS}$ in the gas accumulator of the spring element 5 and of the isentropic exponent k of the gas in the gas accumulator according to the relationship $$c = \left(\frac{p_{FS}}{p_0}\right)^{\frac{k+1}{k}} c_0$$

Figure 5:
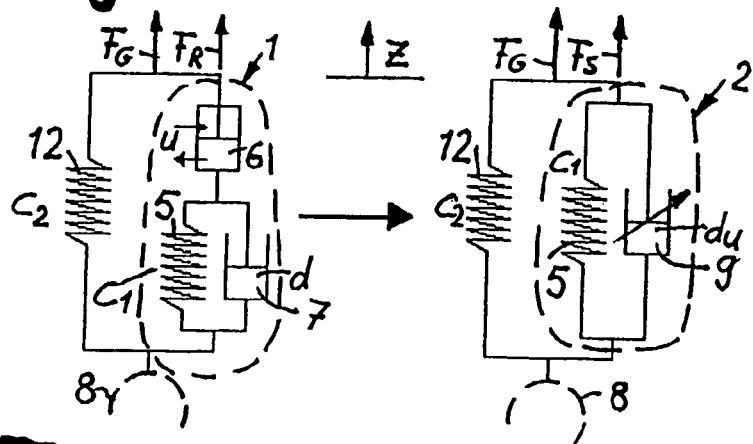
FIG. 5 shows a further exemplary embodiment of an active and a semi-active spring-and-damper system, an active subsystem being replaced by a semi-active subsystem.

In the case of the exemplary embodiment according to FIG. 5, both the actively regulatable reference system 1 and the semi-active replacement system 2 are respectively configured as a subsystem within an overall system, each subsystem being mounted in parallel with an additional, passive spring element 12 with the spring constant $C_2$. The subsystem of the reference system 1 is identical to that of the exemplary embodiment from FIG. 3; accordingly, the function $f$ of the reference subsystem can be described according to the relationship $$f = d(\dot{z} - \dot{u}) + c_1(z - u)$$

where $C_1$ denotes the spring constant of the passive spring element 5 within the reference subsystem 1. The damping value $d_u$ of the damping element 9 in the replacement subsystem 2 is hereby obtained as $$d_u = d - \frac{d \cdot \dot{u} + c_1 \cdot u}{\dot{z}} \approx d - \frac{(d \cdot \dot{u} + c_1 \cdot u)\dot{z}}{\text{limit}[\dot{z}^2]_v^\infty}.$$

Referred to the overall system, the overall force $F_G$ of the reference system can be given as $$F_G = -d(\dot{z} - \dot{u}) - c_1(z - u) - c_2 \cdot z$$

and of the replacement system as $$F_G = -d_u \dot{z} - (c_1 - c_2)z = -d_u \dot{z} - c^* \cdot z$$

where $c^*$ denotes a replacement stiffness for the overall replacement system.

The invention claimed is:

1. A regulatable spring-and-damper system in a vehicle, comprising a spring element and a damping element mounted in parallel,
   wherein one of the elements is adjustable,
   wherein, to realize a semi-active system, the spring element is passive and the damping element is configured with a damping characteristic that can be regulated in a variable manner,
   wherein the semi-active system can be described according to a force profile ($F_S$) such that $$F_S = -c \cdot z - d_u \cdot \dot{z},$$

where c denotes a spring constant of the passive spring element, $d_u$ denotes a damping value that can be regulated in a variable manner, z denotes a state variable of the system, and $\dot{z}$ denotes the derivative with respect to time of the state variable,
   wherein the damping element is regulated by the damping value ($d_u$) following at least approximately the relationship $$d_u = \frac{-c \cdot z + f(z, \dot{z}, u, \dot{u})}{\dot{z}},$$

where u denotes a manipulated variable, $\dot{u}$ denotes the derivative with respect to time of the manipulated variable, and $f$ denotes a known function,
   wherein the function ($f$) is known from an actively regulatable reference system with an adjustable final control element and the force profile ($F_R$) of the reference system can be described by the relationship $$F_R = -f(z, \dot{z}, u, \dot{u}),$$

and
   wherein the manipulated variable (u) or the derivative with respect to time ($\dot{u}$) of the manipulated variable of the adjustable final control element is determinable in a closed-loop and open-loop control unit according to a stored mathematical relationship.

2. The spring-and-damper system as claimed in claim 1, wherein the damping value ($d_u$) is regulated according to an approximation function $$d_u \approx \frac{\dot{z}}{\text{limit}[\dot{z}^2]_v^\infty}\{-c \cdot z + f(z, \dot{z}, u, \dot{u})\},$$

where $\text{limit}[\dot{z}^2]_v^\infty$ denotes a lower, permissible limit (v) and an upper limit ($\infty$) for a square of the rate of the state variable (z).

3. The spring-and-damper system as claimed in claim 1, wherein the spring constant (c) of the passive spring element, in the case of a gas spring, follows the relationship $$c = \left(\frac{p_{FS}}{p_0}\right)^{\frac{k+1}{k}} c_0,$$

where $p_0$ denotes a reference pressure, $c_0$ denotes the spring stiffness at the reference pressure, $p_{FS}$ denotes the pressure in the gas accumulator of the spring element, and k denotes the isentropic exponent of the gas in the gas accumulator.

4. The spring-and-damper system as claimed in claim 1, where, in the case of an actively regulatable reference system, a final control element is mounted in series with the passive spring element and a passive damping element is mounted in parallel with the passive spring element and the final control element, the system can be described by the function $$f = d \cdot \dot{z} + c(z-u),$$

and the damping value ($d_u$) of the regulatable damping element is regulated according to the relationship $$d_u = \frac{-c \cdot z + f}{\dot{z}} = d - \frac{c \cdot u}{\dot{z}}.$$

5. The spring-and-damper system as claimed in claim 1, where, in the case of an actively regulatable reference system, a passive damping element is mounted in parallel with the passive spring element and a final control element is mounted in series with both the passive spring and the passive damping elements, the system can be described by the function $$f = d(\dot{z} - \dot{u}) + c(z-u),$$

and the damping value ($d_u$) of the regulatable damping element is regulated according to the relationship $$d_u = \frac{-c \cdot z + f}{\dot{z}} = d - \frac{d \cdot \dot{u} + c \cdot u}{\dot{z}}.$$

6. The spring-and-damper system as claimed in claim 5, wherein, to realize a semi-active, hydropneumatic spring strut as an adjustable damping element, a regulatable throttle is arranged in a line between a displacer and a hydraulic side of a hydropneumatic spring accumulator as the spring element, and wherein the damping value ($d_u$) is regulatable by adjustment of the throttle.

7. The spring-and-damper system as claimed in claim 6, wherein the derivative with respect to time ($\dot{u}$) of the manipulated variable is proportional to a volumetric flow of oil ($Q_{AHP}$) through the adjustable final control element of the reference system according to the relationship $$\dot{u} = \frac{Q_{AHP}}{A_{HK}},$$

where $A_{HK}$ denotes the surface area of the main chamber of the displacer.

8. The spring-and-damper system as claimed in claim 1, wherein the manipulated variable (u) is high-pass-filtered in the closed-loop and open-loop control unit according to the relationship $$u_{NP} = \frac{T_{HP} \cdot \dot{u}}{T_{HP} \cdot \dot{u} + u}$$

where $T_{HP}$ denotes a gain factor which is determined according to the relationship $$T_{HP} = \frac{1}{2 \cdot \pi \cdot f_{HP}},$$

in which $f_{HP}$ denotes the cutoff frequency of the high-pass filter.

9. The spring-and-damper system as claimed in claim 2, wherein the spring constant (c) of the passive spring element, in the case of a gas spring, follows the relationship $$c = \left(\frac{p_{FS}}{p_0}\right)^{\frac{k+1}{k}} c_0,$$

where $p_0$ denotes a reference pressure, $c_0$ denotes the spring stiffness at the reference pressure, $p_{FS}$ denotes the pressure in the gas accumulator of the spring element, and k denotes the isentropic exponent of the gas in the gas accumulator.

10. The spring-and-damper system as claimed in claim 2, where in the case of an actively regulatable reference system, a final control element is mounted in series with the passive spring element and a passive damping element is mounted in parallel with the passive spring element and the final control element, the system can be described by the function $$f = d \cdot \dot{z} + c(z-u),$$

and the damping value ($d_u$) of the regulatable damping element is regulated according to the relationship $$d_u = \frac{-c \cdot z + f}{\dot{z}} = d - \frac{c \cdot u}{\dot{z}}.$$

11. The spring-and-damper system as claimed in claim 3, where in the case of an actively regulatable reference system, a final control element is mounted in series with the passive spring element and a passive damping element is mounted in parallel with the passive spring element and the final control element, the system can be described by the function $$f = d \cdot \dot{z} + c(z-u),$$

and the damping value ($d_u$) of the regulatable damping element is regulated according to the relationship $$d_u = \frac{-c \cdot z + f}{\dot{z}} = d - \frac{c \cdot u}{\dot{z}}.$$

12. The spring-and-damper system as claimed in claim 2, where, in the case of an actively regulatable reference system, a passive damping element is mounted in parallel with the passive spring element and a final control element is mounted in series with both the passive spring and the passive damping elements, the system can be described by the function $$f = d(\dot{z} - \dot{u}) + c(z-u),$$

and the damping value ($d_u$) of the regulatable damping element is regulated according to the relationship $$d_u = \frac{-c \cdot z + f}{\dot{z}} = d - \frac{d \cdot \dot{u} + c \cdot u}{\dot{z}}.$$

13. The spring-and-damper system as claimed in claim 3, where, in the case of an actively regulatable reference system, a passive damping element is mounted in parallel with the passive spring element and a final control element is mounted in series with both the passive spring and the passive damping elements, the system can be described by the function $$f = d(\dot{z} - \dot{u}) + c(z - u),$$

and the damping value ($d_u$) of the regulatable damping element is regulated according to the relationship $$d_u = \frac{-c \cdot z + f}{\dot{z}} = d - \frac{d \cdot \dot{u} + c \cdot u}{\dot{z}}.$$

14. The spring-and-damper system as claimed in claim 4, where, in the case of an actively regulatable reference system, a passive damping element is mounted in parallel with the passive spring element and a final control element is mounted in series with both the passive spring and the passive damping elements, the system can be described by the function $$f = -d(\dot{z} - \dot{u}) + c(z - u),$$

and the damping value ($d_u$) of the regulatable damping element is regulated according to the relationship $$d_u = \frac{-c \cdot z + f}{\dot{z}} = d - \frac{d \cdot \dot{u} + c \cdot u}{\dot{z}}.$$

15. The spring-and-damper system as claimed in claim 12, wherein, to realize a semi-active, hydropneumatic spring strut as an adjustable damping element, a regulatable throttle is arranged in a line between a displacer and a hydraulic side of a hydropneumatic spring accumulator as the spring element, and wherein the damping value ($d_u$) is regulatable by adjustment of the throttle.

16. The spring-and-damper system as claimed in claim 15, wherein the derivative with respect to time ($\dot{u}$) of the manipulated variable is proportional to a volumetric flow of oil ($Q_{AHP}$) through the adjustable final control element of the reference system according to the relationship $$\dot{u} = \frac{Q_{AHP}}{A_{HK}},$$

where $A_{HK}$ denotes the surface area of the main chamber of the displacer.

17. The spring-and-damper system as claimed in claim 13, wherein, to realize a semi-active, hydropneumatic spring strut as an adjustable damping element, a regulatable throttle is arranged in a line between a displacer and a hydraulic side of a hydropneumatic spring accumulator as the spring element, and wherein the damping value ($d_u$) is regulatable by adjustment of the throttle.

18. The spring-and-damper system as claimed in claim 17, wherein the derivative with respect to time ($\dot{u}$) of the manipulated variable is proportional to a volumetric flow of oil ($Q_{AHP}$) through the adjustable final control element of the reference system according to the relationship $$\dot{u} = \frac{Q_{AHP}}{A_{HK}},$$

where $A_{HK}$ denotes the surface area of the main chamber of the displacer.

19. The spring-and-damper system as claimed in claim 2, wherein the manipulated variable (u) is high-pass-filtered in the closed-loop and open-loop control unit according to the relationship $$u_{NP} = \frac{T_{HP} \cdot \dot{u}}{T_{HP} \cdot \dot{u} + u}$$

where $T_{HP}$ denotes a gain factor which is determined according to the relationship $$T_{HP} = \frac{1}{2 \cdot \pi \cdot f_{HP}}$$

in which $f_{HP}$ denotes the cutoff frequency of the high-pass filter.

20. A regulatable spring-and-damper system in a vehicle, comprising a spring element and a damping element mounted in parallel, one of the elements being adjustable, wherein to realize a semi-active system, the spring element is passive and the damping element is configured with a damping characteristic that can be regulated in a variable manner and the semi-active system can be described according to a force profile which can be represented as a function of a variable describing the spring constant of the passive spring element and/or of a variable describing a damping value that can be regulated in a variable manner and/or of a variable describing a state variable of the system and/or of a variable describing the derivative with respect to time of the state variable and in that the damping element is regulated by the damping value following at least approximately a relationship which can be represented as a function of the variable describing the spring constant of the passive spring element and/or of a manipulated variable and/or of a variable describing the derivative with respect to time of the manipulated variable and/or of the variable describing the state variable of the system and/or of the variable describing the derivative with respect to time of the state variable, this relationship being based on a function which is known from an actively regulatable reference system with an adjustable final control element and the force profile of the reference system being able to be described according to a relationship which can be represented as a function of the manipulated variable and/or of the variable describing the derivative with respect to time of the manipulated variable and/or of the variable describing the state variable of the system and/or of the variable describing the derivative with respect to time of the state variable, with the manipulated variable and/or the variable of the adjustable final control element describing the derivative with respect to time of the manipulated variable being determinable in a closed-loop and open-loop control unit according to a stored mathematical relationship.

* * * * *